US012585012B2

(12) United States Patent
Godaliyadda et al.

(10) Patent No.: US 12,585,012 B2
(45) Date of Patent: Mar. 24, 2026

(54) INVERSE RADAR SENSOR MODEL AND EVIDENTIAL GRID MAPPING PROCESSORS

(71) Applicant: Texas Instruments Incorporated, Dallas, TX (US)

(72) Inventors: Gunawath Dilshan Godaliyadda, Allen, TX (US); June Chul Roh, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 167 days.

(21) Appl. No.: 18/644,510

(22) Filed: Apr. 24, 2024

(65) Prior Publication Data

US 2024/0272297 A1 Aug. 15, 2024

Related U.S. Application Data

(63) Continuation of application No. 17/472,809, filed on Sep. 13, 2021, now Pat. No. 11,994,582.

(51) Int. Cl.
*G01S 13/931* (2020.01)
*G01S 13/72* (2006.01)
(52) U.S. Cl.
CPC .......... *G01S 13/931* (2013.01); *G01S 13/726* (2013.01); *G01S 2013/93274* (2020.01)
(58) Field of Classification Search
None
See application file for complete search history.

(56) References Cited

U.S. PATENT DOCUMENTS

| 5,123,057 A | 6/1992 | Verly et al. |
| 6,125,339 A | 9/2000 | Reiser et al. |

(Continued)

FOREIGN PATENT DOCUMENTS

| DE | 102018100907 A1 | 7/2019 |
| DE | 102019109332 A1 | 10/2020 |
| WO | 2020094170 A1 | 5/2020 |

OTHER PUBLICATIONS

Godaliyadda, G. et al., "Multi-Sensor Fusion in Dynamic Environment Using Evidential Grid Mapping." Electronic Imaging, Jan. 2020, 6 pages.

*Primary Examiner* — Bernarr E Gregory
(74) *Attorney, Agent, or Firm* — Michael T. Gabrik; Frank D. Cimino

(57) ABSTRACT

An example device includes motion sensing and processing circuitry to generate compensated motion data for a first time based on raw motion data and a set of motion indicators including a velocity indicator for the device calculated based on the raw motion data; a radar sensor to receive reflections indicating detections and generate data points for the first time representing the detections, in which each data point includes position and velocity information of a corresponding detection relative to the radar sensor; a first circuit to generate object data for the first time based on the set of the data points and the compensated motion data for the first time; and a second circuit to calculate, based on the object data for the first time and a characteristic of the radar sensor, for each cell in a grid representing an FOV of the radar sensor at the first time, probabilities of the cell being in a free state, a stationary state, and a dynamic state.

20 Claims, 5 Drawing Sheets

(56)                    References Cited

U.S. PATENT DOCUMENTS

| | | |
|---|---|---|
| 7,421,419 B2 | 9/2008 | Maren |
| 10,657,393 B2 | 5/2020 | Foroughi et al. |
| 2002/0019697 A1 | 2/2002 | Cong et al. |
| 2003/0191610 A1 | 10/2003 | Chen et al. |
| 2017/0247036 A1* | 8/2017 | Halder .................. G01S 13/931 |
| 2018/0012370 A1* | 1/2018 | Aghamohammadi ........................ G06F 18/251 |
| 2020/0103523 A1* | 4/2020 | Liu ........................ G01S 13/931 |
| 2021/0131823 A1 | 5/2021 | Giorgio et al. |
| 2022/0057232 A1* | 2/2022 | Shen .................... G01S 13/931 |

* cited by examiner

500

600

INVERSE RADAR SENSOR MODEL AND EVIDENTIAL GRID MAPPING PROCESSORS

CROSS REFERENCE TO RELATED APPLICATION(S)

This application is a continuation of U.S. application Ser. No. 17/472,809, filed Sep. 13, 2021, now U.S. Pat. No. 11,994,582, the content of which is incorporated by reference herein.

BACKGROUND

Some radar sensor systems use evidential grid mapping algorithms to process the radar sensor data in the context of environmental understanding, where a grid map is used as a representation or approximation of the real environment. Each cell in a grid map represents a location in the environment, typically using a fixed frame, and is assigned a state, such as an "occupied" state that indicates a probability that an object is present at that location or a "free" state that indicates a probability that the location is unoccupied. The occupied state can be further refined to a "dynamic" state that indicates the probability that the object at the location is moving (that is, "dynamic") and a "static-dynamic" state used to represent an uncertainty whether the object at the location is stationary, that is, "static," or dynamic. When a radar sensor is mounted on a moving platform, it can be difficult to determine whether a measurement is indicative of a static object or a dynamic object. The static-dynamic state is introduced to represent this uncertainty.

The evidence from a radar sensor at a particular instant in time about a state is called the "instantaneous mass" of the state. Evidential grid mapping algorithms iteratively process the instantaneous mass for a particular time with instantaneous masses at prior times to formulate a more accurate grid map. Some evidential grid mapping algorithms struggle to distinguish artifacts due to noise in the radar sensor data, for example, from artifacts due to dynamic objects in the radar sensor data, which reduces the quality of the resulting representation of the environment. In addition, some evidential grid mapping algorithms do not account for sensor characteristics in determining the probability that a cell is in a free, dynamic, or static-dynamic state. For example, the antenna gain pattern of a radar sensor can vary over azimuth angle, which influences the reliability and/or accuracy of measured radar data points in determining the probability that a cell is in free, dynamic, or static-dynamic state.

SUMMARY

Systems, devices and instruction-carrying computer readable mediums may be used to implement improved radar-based techniques for identifying and tracking of objects that reduce artifacts caused by detected dynamic objects and noise in occupancy grid maps. Inverse sensor modeling and grid mapping may be employed. Using motion and radar inputs, a computation made at given time determines whether there is evidence that a cell in a grid representing a field of view (FOV) of the radar sensor is occupied by stationary object, occupied by a dynamic object, or is free (unoccupied).

In an example, a device includes motion sensing and processing circuitry configured to generate compensated motion data for a first time based on raw motion data and a set of motion indicators including a velocity indicator for the device calculated based on the raw motion data; and a radar sensor configured to receive reflections indicating detections and generate data points for the first time representing the detections, in which each data point includes position and velocity information of a corresponding detection relative to the radar sensor. The device further includes first and second circuits. The first circuit is configured to generate object data for the first time based on the set of the data points for the first time and the compensated motion data for the first time; and the second circuit configured to calculate, based on the object data for the first time and a characteristic of the radar sensor, for each cell in a grid representing an FOV of the radar sensor at the first time, probabilities of the cell being in a free state indicating no detected object in the cell, a stationary state indicating a stationary detected object in the cell, and a dynamic state indicating that a dynamic object detected in the cell.

BRIEF DESCRIPTION OF THE DRAWINGS

For a detailed description of various examples, reference will now be made to the accompanying drawings in which.

DETAILED DESCRIPTION

The grid mapping system described herein includes a radar sensor, an inverse radar sensor model processor, and a grid mapping processor. The radar sensor outputs sensor data, such as point cloud data with range, azimuth angle, radial velocity, and an associated reflectivity or an associated signal-to-noise ratio for each point, to the inverse radar sensor model processor, which generates object data representative of locations in two-dimensional space at which the radar reflections are centered based on the sensor data. The inverse radar sensor model processor then calculates instantaneous masses for each cell in a field of view of the radar sensor based on the object data and a sensor characteristic. The instantaneous masses for each cell can be determined based on a probability of occupancy for the cell, a radial velocity for the cell, and the sensor characteristic associated with the position of the cell. The grid mapping processor then iteratively processes the calculated instantaneous mass for each cell at a particular time with instantaneous masses from prior times to generate an accumulated mass and a more accurate grid map.

Figures 1, 2:
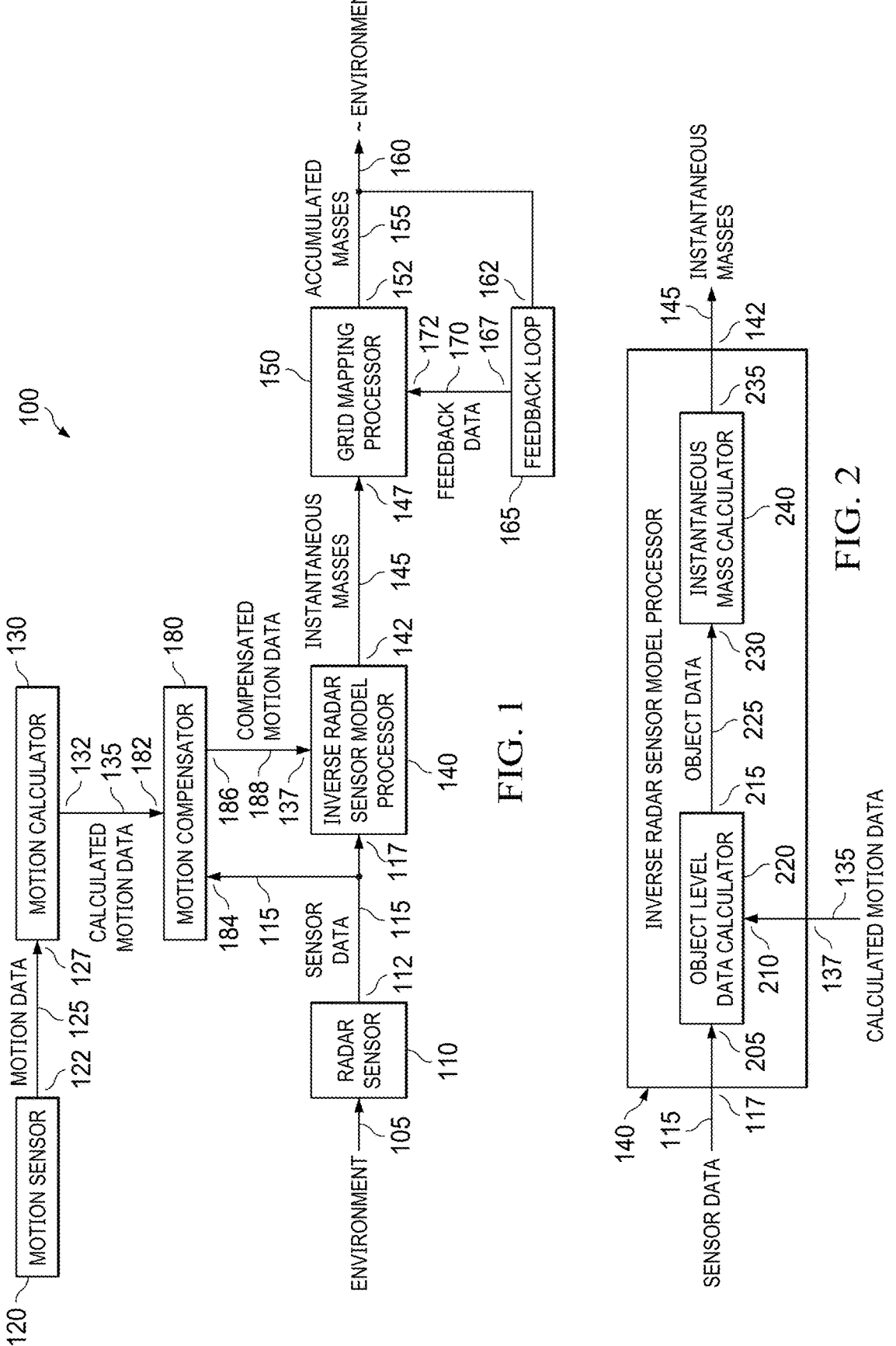
FIG. 1 shows a block diagram of an example evidential grid mapping system.
FIG. 2 shows a block diagram of an example inverse radar sensor model processor for the evidential grid mapping system shown in FIG. 1.

FIG. 1 illustrates a block diagram of an example evidential grid mapping system 100, which includes a radar sensor 110, a motion sensor 120, a motion calculator 130, a motion compensator 180, an inverse radar sensor model processor 140, a grid mapping processor 150, and a feedback loop 165. The radar sensor 110 includes an output 112 and generates sensor data 115 based on the environment 105. The sensor data 115 can be point cloud data with a range, azimuth angle, radial velocity, and an associated reflectivity or an associated signal-to-noise ratio for each point in the point cloud. The radar sensor output 112 is coupled to an input 117 of the inverse radar sensor model processor 140 and to an input 184 of the motion compensator 180. The motion sensor 120 includes an output 122 and generates motion data 125 that describes the movement of the system 100. The motion sensor 120 can be any appropriate kind of motion sensor, such as an inertial measurement unit, an accelerometer, a geomagnetic field sensor, global navigation satellite system, global positioning system, and the like, or any combination thereof.

The motion calculator 130 receives the motion data 125 at an input 127 and determines calculated motion data 135, such as the position, the velocity, and the attitude of the system 100. An output 132 of the motion calculator 130 is coupled to an input 182 of the motion compensator 180, and the motion compensator 180 compensates a radial velocity for each radar measurement in the sensor data 115 to account for the estimated motion of the radar sensor 110. For example, the system 100 is mounted in a vehicle as part of a driver assistance system, and the motion compensator 180 compensates the radial velocities based on the calculated motion data 135 to account for at least some of the vehicle motion.

An output 186 of the motion compensator 180 is coupled to an input 137 of the inverse radar sensor model processor 140 and provides the compensated motion data 188 to the inverse radar sensor model processor 140. The inverse radar sensor model processor 140 calculates an instantaneous mass for each cell in the grid mapping based on the sensor data 115 and the compensated motion data 188 and outputs the instantaneous masses 145 through an output 142. An input 147 of the grid mapping processor 150 is coupled to the output 142 of the inverse radar sensor model processor 140, and receives the instantaneous masses 145. The grid mapping processor 150 processes the instantaneous masses 145 with prior instantaneous masses to update an accumulated grid mapping and outputs the accumulated masses 155 processor 150. An output 167 of feedback loop 165 is coupled to an input 172 of the grid mapping processor 150 to provide the feedback data 170.

FIG. 2 shows a block diagram 200 of an example inverse radar sensor model processor 140 for the evidential grid mapping system shown in FIG. 1. The example inverse radar sensor model processor 140 includes an object level data calculator 220 and an instantaneous mass calculator 240. The object level data calculator 220 has an input 205 for the sensor data 115, an input 210 for the calculated motion data 135, and an output 215 for the object data 225. The object level data calculator 220 generates the object data 225 based on the sensor data 115 and the calculated motion data 135. The object data 225 includes locations in two-dimensional (2D) space at which the sensor data 115 indicates the radar reflections are centered, the compensated radial velocity at those locations, and the ambiguity of the measurements as a signal-to-noise ratio (SNR).

The output 215 of the object level data calculator 220 is coupled to an input 230 of the instantaneous mass calculator 240. The instantaneous mass calculator 240 computes the instantaneous mass for each cell being free (F), occupied by a dynamic object (D), or occupied by an object that might be moving or stationary (SD). For each cell (i,j), the instantaneous mass calculator 240 uses the probability of occupancy Pocc(i,j) based on the object level data, the position of the cell with respect to the radar sensor and other cells with a positive probability of occupancy, and the radial velocity for the cell. The accuracy of the sensor data 115 varies based on the position (i,j) of the cell with respect to the radar sensor 110, and the position (i,j) of the cell with respect to other occupied cells can identify occlusions by objects in between the particular location and the radar sensor 110. An example process for calculating the instantaneous mass is described further herein with respect to FIG. 4. The instantaneous mass calculator 240 outputs the instantaneous masses 145 through an output 235 to the grid mapping processor 150.

TABLE 1

Figure 3A:
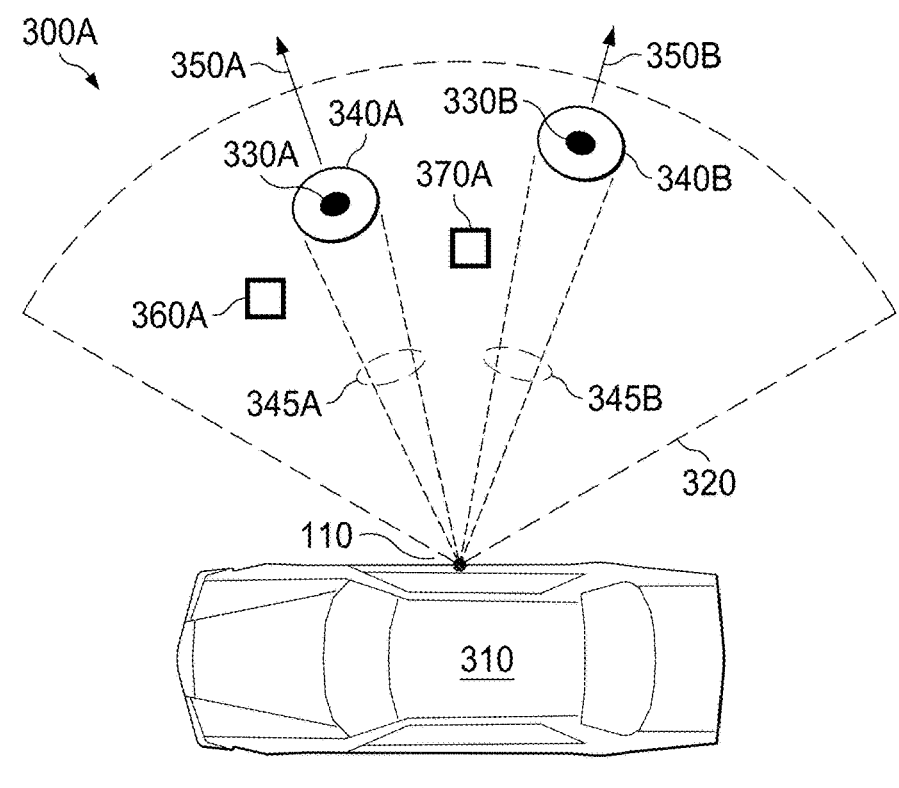
FIGS. 3A-D illustrate example scenarios for an inverse radar sensor model processor shown in FIG. 2.
Figure 3B:
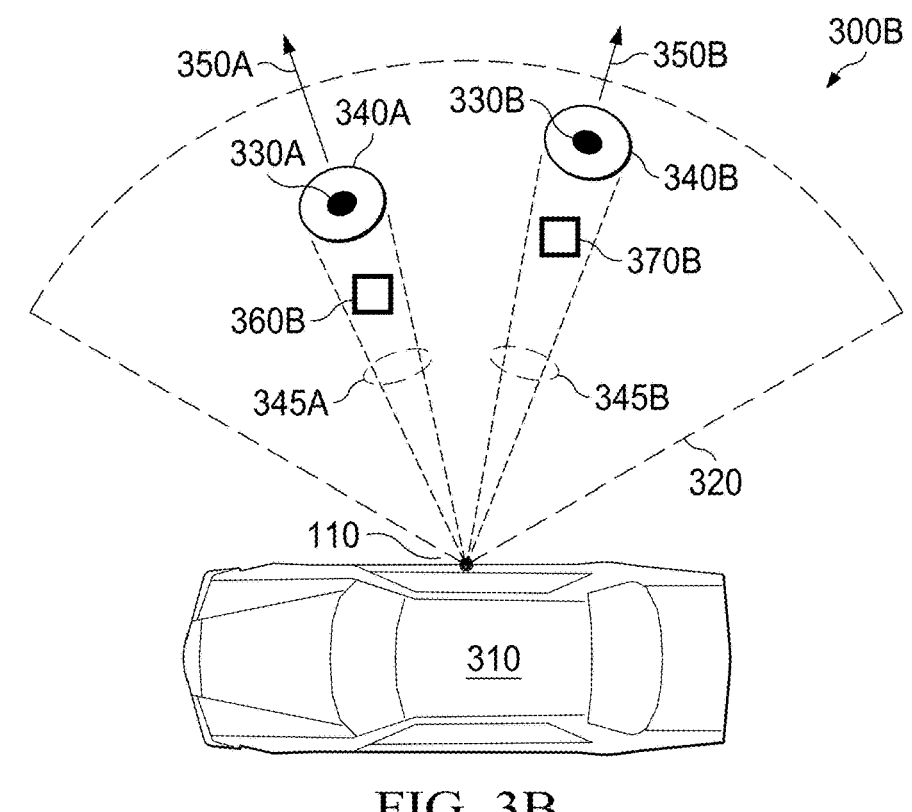
Figure 3C:
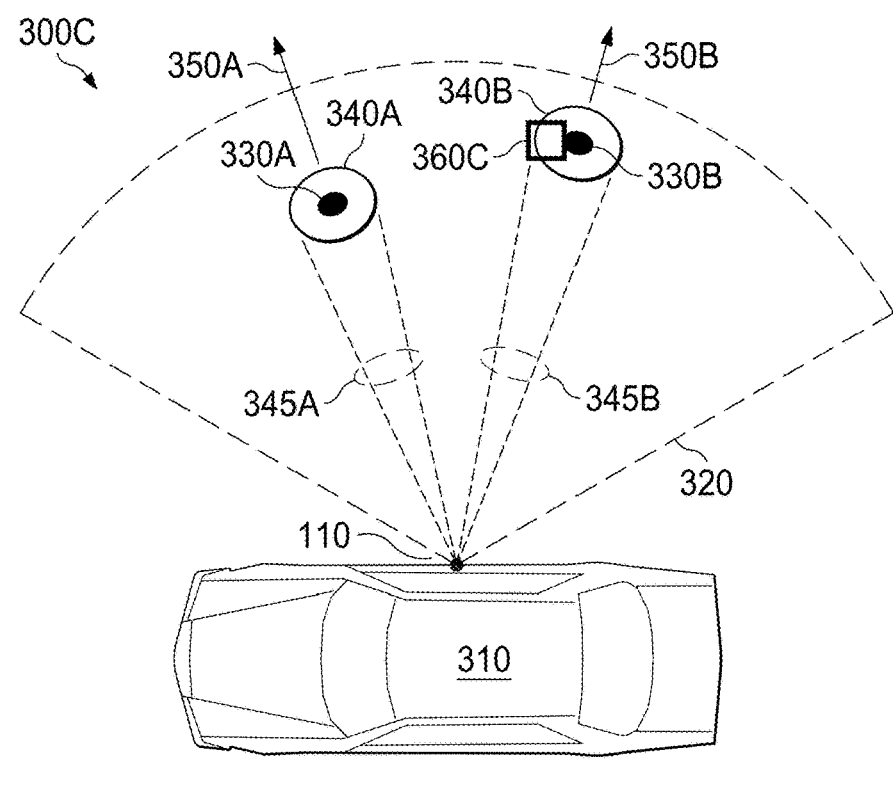
Figure 3D:
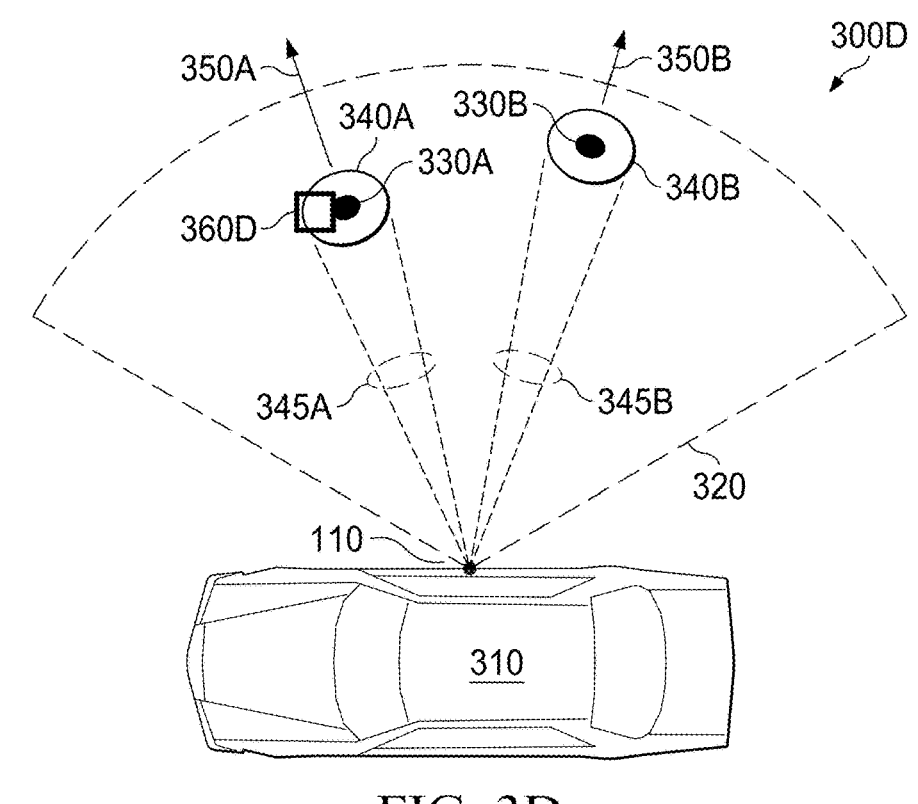

| | Scenario | $m_{i,j;k}(D)$ | $m_{i,j;k}(SD)$ | $m_{i,j;k}(F)$ |
|---|---|---|---|---|
| Pocc(i, j; k) ≤ ∈occ<br>v(i, j; k) = 0 | Scenario 300A shown in FIG. 3A | 0 | 0 | $p^{f,1}$<br>$* w^{f,1}(\theta_{i,j;k})$<br>$* w^{f,1}(r_{i,j;k})$ |
| Pocc(i, j; k) ≤ ∈occ<br>v(i, j; k) = 0 | Scenario 300B shown in FIG. 3B | 0 | 0 | $p^{f,2}$<br>$* w^{f,2}(\theta_{i,j})$<br>$* w^{f,2}(r_{i,j})$ |
| Pocc(i, j; k) > ∈occ<br>v(i, j; k) ≤ ∈v | Scenario 300C shown in FIG. 3C | 0 | Pocc(i, j; k) | 0 |
| Pocc(i, j; k) > ∈occ<br>v(i, j; k) > ∈v | Scenario 300D shown in FIG. 3D | Pocc(i, j; k) | 0 | 0 | through an output 152. The accumulated masses 155 can be used to generate an approximate representation of the environment 160.

In turn, the approximate representation of the environment 160 can be used by other system to provide alerts, update parameters, and perform other actions. Returning to the example in which the system 100 is mounted in a vehicle as part of a driver assistance system, the approximate representation of the environment 160 can be used to identify obstacles such as parked and moving vehicles, pedestrians, bicyclists, and the like; present driver alerts such as a proximity alert; adjust a vehicle speed during a parking assistance operation; and the like. The feedback loop 165 receives the accumulated masses 155 at an input 162 and determines feedback data 170 for the grid mapping Table 1 summarizes the scenarios 300 shown in FIGS. 3A-D. The scenarios 300A-D show the radar sensor 110 mounted in a vehicle 310 and the corresponding field of view (FOV) 320. Within the FOV 320, radar sensor 110 detects radar reflections 330A and 330B with compensated radial velocities indicated by arrows 350A and 350B, respectively. The longer arrow 350A indicates a greater compensated radial velocity than the shorter arrow 350B. The region 340A around the radar reflection 330A represents the particular cells that are considered "occupied" based on the radar reflection 330A and the corresponding probability of occupancy. The region 340B around the radar reflection 330B represents the particular cells that are considered "occupied" based on the radar reflection 330B and the corresponding probability of occupancy.

v(i,j;k) represents the compensated radial velocity associated with a cell (i,j) at a time k. The first entry in table 1 corresponds to the scenario 300A shown in FIG. 3A, in which the cells 360A and 370A are unoccupied and not between the radar sensor 110 and the occupied cells in regions 340A and 340B. That is, the probability of occupancy Pocc(i,j;k) for each of cells 360A and 370A does not satisfy a threshold occupancy criterion ∈occ, and the compensated radial velocity v(i,j;k) for each of cells 360A and 370A is equal to zero. For example, Pocc(i,j;k) can be less than or equal to ∈occ. The instantaneous mass calculator 240 calculates the instantaneous mass $m_{(i,j;k)}$(F) for a free cell with low confidence $p^{f,1}$ and sets the instantaneous masses $m_{(i,j;k)}$(D) for a dynamic cell and $m_{(i,j;k)}$(SD) for a static-dynamic cell to zero.

The second entry in table 1 corresponds to the scenario 300B shown in FIG. 3B, in which the cells 360B and 370B are unoccupied and between the radar sensor 110 and the occupied cells in regions 340A and 340B. That is, the probability of occupancy Pocc(i,j;k) for each of cells 360B and 370B does not satisfy a threshold occupancy criterion ∈occ, and the compensated radial velocity v(i,j;k) for each of cells 360B and 370B is equal to zero. For example, Pocc(i,j;k) can be less than or equal to ∈occ. The instantaneous mass calculator 240 calculates the instantaneous mass $m_{(i,j;k)}$(F) for a free cell with high confidence $p^{f,2}$ and sets the instantaneous masses $m_{(i,j;k)}$(D) for a dynamic cell and $m_{(i,j;k)}$(SD) for a static-dynamic cell to zero.

The third entry in table 1 corresponds to scenario 3000 shown in FIG. 3C, in which the cell 360C is occupied in region 340B but has a compensated radial velocity 350B that does not satisfy a threshold velocity criterion ∈v. That is, the probability of occupancy Pocc(i,j;k) for cell 360C satisfies a threshold occupancy criterion ∈occ, and the compensated radial velocity v(i,j;k) for cell 360C does not satisfy a threshold velocity criterion ∈v. For example, Pocc(i,j;k) can be greater than ∈occ, and v(i,j;k) can be less than or equal to ∈v. The instantaneous mass calculator 240 calculates the instantaneous mass $m_{(i,j;k)}$(SD) for a static-dynamic cell and sets the instantaneous masses $m_{(i,j;k)}$(D) for a dynamic cell and $m_{(i,j;k)}$(F) for a free cell to zero.

The fourth entry in table 1 corresponds to scenario 300D shown in FIG. 3D, in which the cell 360D is occupied in region 340A with a compensated radial velocity 350A that satisfies ∈v. That is, the probability of occupancy Pocc(i,j;k) for cell 360D satisfies a threshold occupancy criterion ∈occ, and the compensated radial velocity v(i,j;k) for cell 360D satisfies the threshold velocity criterion ∈v. For example, Pocc(i,j;k) can be greater than ∈occ, and v(i,j;k) can be greater than ∈v. The instantaneous mass calculator 240 calculates the instantaneous mass $m_{(i,j;k)}$(D) for a dynamic cell and sets the instantaneous masses $m_{(i,j;k)}$(SD) for a static-dynamic cell and $m_{(i,j;k)}$(F) for a free cell to zero.

Figure 4:
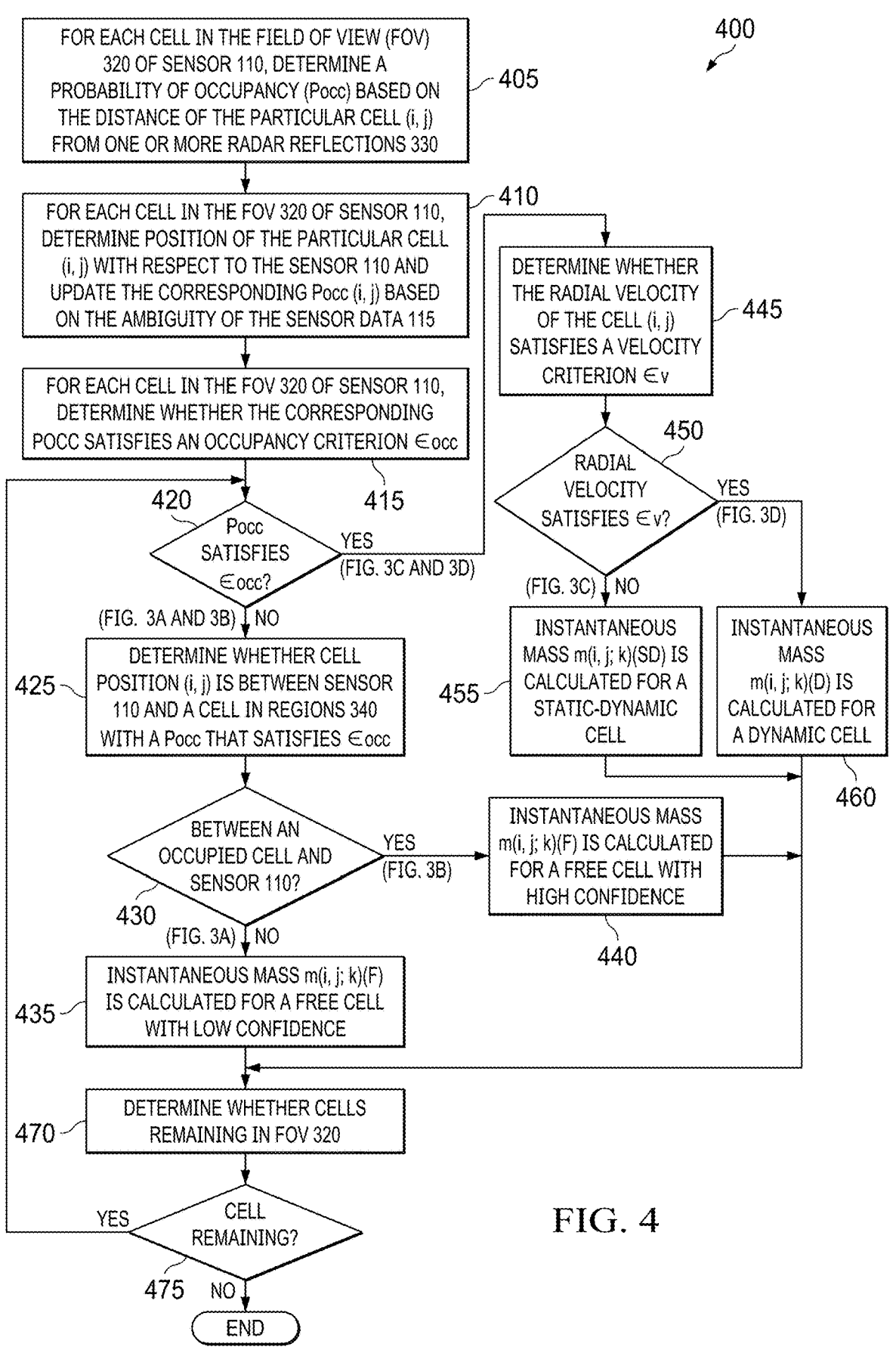
FIG. 4 illustrates, in flowchart form, an example process for calculating instantaneous masses.

FIG. 4 illustrates, in flowchart form, an example process 400 for calculating instantaneous masses. The process 400 is performed by a processing unit executing instructions stored in a non-transitory computer-readable medium, such as a static random access memory (SRAM). For example, the process 400 can be performed by the instantaneous mass calculator 240 described above with reference to FIG. 2 executing instructions stored in SRAM. For ease of explanation, the process 400 is described herein with reference to the grid mapping system 100 shown in FIG. 1, the inverse radar sensor model processor shown in FIG. 2, and scenarios 300A-D shown in FIGS. 3A-D.

The process 400 begins at step 405, where the instantaneous mass calculator 240 determines, for each cell (i,j) in the FOV 320 of the radar sensor 110, a probability of occupancy Pocc(i,j) based on the distance of the particular cell (i,j) from the radar reflections 330A and 330B indicated in the sensor data 115. For example, the probability of occupancy Pocc(i,j) at a time k can be represented with a two-dimensional Gaussian probability density in polar coordinates as follows:

$$P_{i,j;k}^{occ} = 1_{\{\tilde{P}_{i,j;k}^{occ} > \epsilon_{occ}\}} \tilde{P}_{i,j;k}^{occ}$$

where $$\tilde{P}_{i,j;k}^{occ} = \frac{a^2}{|\partial R_{i,j;k}|} \left\{ \sum_{l_m \in \partial R_{i,j;k}} \frac{1}{2\pi |\sum_{l_m}|} \exp\left\{ -\frac{1}{2} (c_{l_m} - c_{i,j})^t \sum_{l_m}^{-1} (c_{l_m} - c_{i,j}) \right\} \right\}$$

The expression 1

$$\{\tilde{P}_{i,j;k}^{occ} > \epsilon_{rad}\}$$

is an indicator function equal to one while the probability of occupancy Pocc(i,j) is greater than a threshold occupancy criterion $\epsilon_{occ}$ and zero otherwise, $a^2$ represents the area of the cell (i,j), $R_k = \{1_1, \ldots 1_{N_k}\}$ are radar measurements made at the time k, $\partial R_{i,j;k} \subseteq R_k$ are a subset of the measurements $R_k$ that are within a predefined distance from the cell (i,j), $c_{l_m}$ are the two-dimensional polar coordinates (that is, the range and azimuth angle) of a radar measurement $1_m$, $c_{i,j}$ are the two-dimensional polar coordinates of the cell (i,j) with respect to the radar sensor 110, $$\sum_{l_m} = \begin{bmatrix} \sigma_{r,l_m}^2 & 0 \\ 0 & \sigma_{\theta,l_m}^2 \end{bmatrix} \text{ and } \sigma_{r,l_m}^2, \sigma_{\theta,l_m}^2$$

are the variances of the radar measurement $1_m$ in a range r and an angle θ. The predefined distance from the cell (i,j) can be the Euclidean distance from the cell, in some implementations.

Figure 5:
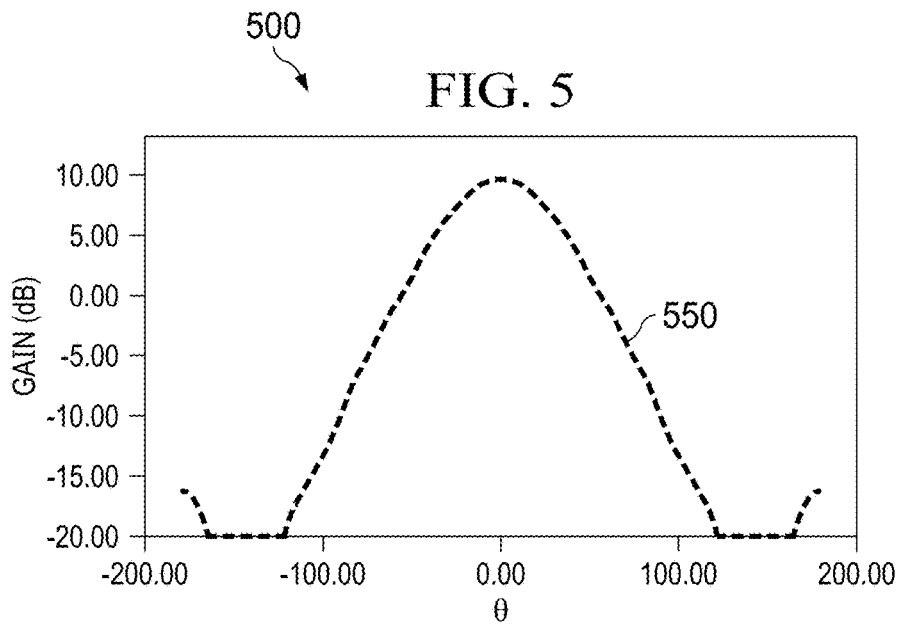
FIG. 5 shows a graph of an antenna gain pattern over azimuth angle for an example radar sensor included in the evidential grid mapping system shown in FIG. 1.

At step 410, the instantaneous mass calculator 240 determines, for each cell (i,j) in the FOV 320, a position of the cell with respect to the sensor 110 and updates the corresponding Pocc(i,j) based on the ambiguity of the sensor data 115. The SNR of the radar sensor 110 can vary with respect to the angle and distance from the radar sensor 110, and thus the ambiguity of the sensor data 115 varies with respect to the angle and distance as well. FIG. 5 shows a graph 500 of radar sensor gain 550 over azimuth angle, which varies by several tens of decibels (dB) across the azimuth angles and influences the SNR of the radar sensor 110 accordingly.

Returning to FIG. 4, at step 415 the instantaneous mass calculator 240 determines, for each cell (i,j) in the FOV 320, whether the corresponding Pocc(i,j) satisfies an occupancy criterion ∈occ. For example, the occupancy criterion ∈occ may represent a threshold probability of 70%, such that a cell (i,j) is considered occupied in response to the corresponding probability of occupancy Pocc(i,j) being greater than 70%. If the Pocc(i,j) does not satisfy the occupancy criterion ∈occ at step 420, it is likely the cell is free. FIGS. 3A and 3B illustrate scenarios 300A and 300B in which the cells 360A and 370A and 360B and 370B, respectively, are not included in the regions 340A and 340B of cells around the radar reflections 330A and 330B with Pocc(i,j) that satisfy ∈occ. Thus, cells 360A and 370A and 360B and 370B in scenarios 300A and 300B, respectively, are likely free.

The instantaneous mass calculator 240 proceeds to step 425 and determines whether the cell position (i,j) is in the path 345A between the sensor 110 and an occupied cell in the region 340A or in the path 345B between the sensor 110 and an occupied cell in the region 340B. For example, the instantaneous mass calculator 240 can compare the azimuth angle $\theta_{i,j}$ of the cell with respect to the radar sensor 110 to the azimuth angle $\theta_{330A}$ of the radar reflection 330A and the azimuth angle $\theta_{330B}$ of the radar reflection 330B with respect to the radar sensor 110. The instantaneous mass calculator 240 can determine a range of angles $[\theta_{330A}-\in_{\theta A}, \theta_{330A}+\in_{\theta A}]$ around the radar reflection 330A and a range of angles $[\theta_{330B}-\in_{\theta B}, \theta_{330B}+\in_{\theta B}]$ around the radar reflection 330B, where $\in_{\theta A}$ is chosen to represent the azimuth angle for a cell at the edge of the radar reflection 330A with a Pocc that satisfies ∈occ and $\in_{\theta B}$ is chosen to represent the azimuth angle for a cell at the edge of the radar reflection 330B with a Pocc that satisfies ∈ occ. The instantaneous mass calculator 240 can then determine whether the azimuth angle $\theta_{i,j}$ of the cell is within the range of angles $[\theta_{330A}-\in_{\theta A}, \theta_{330A}+\in_{\theta A}]$ or $[\theta_{330B}-\in_{\theta B}, \theta_{330B}+\in_{\theta B}]$.

If the cell is not between an occupied cell and the sensor 110 at step 430, as illustrated in scenario 300A in FIG. 3A, the instantaneous mass calculator 240 calculates the instantaneous mass $m_{(i,j;k)}$(F) for a free cell (F) at a cell position (i,j) and a time k with low confidence $p^{f,1}$ at step 435. The instantaneous mass $m_{(i,j;k)}$(D) for a dynamic cell (D) and the instantaneous mass $m_{(i,j;k)}$(SD) for a static-dynamic cell (SD) at the cell position (i,j) and the time k are set to zero.

For example, the instantaneous mass $m_{(i,j;k)}$(F) with a low confidence $p^{f,1}$ can be represented as:

$$m_{(i,j;k)}(F) = p^{f,1} * w^{f,1}(\theta_{i,j}) * w^{f,1}(r_{i,j})$$

where $p^{f,1}$ represents a constant between zero and one, $w^{f,1}(\theta_{i,j})$ represents a first weight based on the gain of the sensor 110 at the particular angle $\theta_{i,j}$ of the cell position with respect to the sensor 110, and $w^{f,1}(\theta_{i,j})$ represents a second weight based on the gain of the radar sensor 110 at the particular range $r_{i,j}$ of the cell position with respect to the radar sensor 110. The weights $w^{f,1}(\theta_{i,j})$ and $w^{f,1}(r_{i,j})$ can be looked up from a table based on the known behavior of the gain of the radar sensor 110.

In some implementations, the first weight $w^{f,1}(\theta_{i,j})$ is a function based on the radar sensor gain 550 over azimuth angle $\theta_{i,j}$ as shown in FIG. 5, normalized to a number between zero and one. For example, the first weight $w^{f,1}(\theta_{i,j})$ can be represented as:

$$w^{f,1}(\theta_{i,j}) = \begin{cases} \cos\left(\dfrac{|\theta_{i,j}| * 90}{\theta_{max}}\right) & \text{if } \theta_{i,j} \le \theta_{max} \\ 0 & \text{otherwise} \end{cases}$$

where $\theta_{max}$ represents the angles of the edges of the FOV 320 for sensor 110. In some implementations, the second weight $w^{f,1}(r_{i,j})$ is a function in which the weight $w^{f,1}$ decreases monotonically with range $(r_{i,j})$. For example, the second weight $w^{f,1}(r_{i,j})$ can be based on the radar sensor gain over range, and represented as:

$$w^{f,1}(r_{i,j}) = \begin{cases} 1 & \text{if } (r_{i,j}) < r_1 \\ e^{-b[(r_{i,j})-r_{max}]} & \text{if } r_1 \le (r_{i,j}) \le r_{max} \\ 0 & \text{otherwise} \end{cases}$$

where $r_1$ represents a range of an object, $r_{max}$ represents a maximum range for the sensor 110, and b represents a constant chosen based on the characteristics of sensor 110.

Returning to step 430, if the cell is between an occupied cell and the radar sensor 110, as illustrated in scenario 300B in FIG. 3B, the instantaneous mass calculator 240 calculates the instantaneous mass $m_{(i,j;k)}$(F) for a free cell (F) at a cell position (i,j) and a time k with high confidence $p^{f,2}$ at step 440. The cell 360B is in path 345A between the radar sensor 110 and the occupied region 340A, and the cell 370B is in path 345B between the radar sensor 110 and the occupied region 340B. If the cells 360B and 370B were occupied, that is, not free, the cells would occlude the occupied regions 340A and 340B, respectively. Since the occupied regions 340A and 340B are not occluded, there is a high confidence $p^{f,2}$ that the cells 360B and 370B are free. The instantaneous mass $m_{(i,j;k)}$(D) and the instantaneous mass $m_{(i,j;k)}$(SD) at the cell position (i,j) and the time k are set to zero.

For example, the instantaneous mass $m_{(i,j;k)}$(F) with high confidence $p^{f,2}$ can be represented as:

$$m_{(i,j;k)}(F) = p^{f,2} * w^{f,2}(\theta_{i,j}) * w^{f,2}(r_{i,j})$$

where $p^{f,2}$ represents a constant greater than $p^{f,1}$ and less than one, $w^{f,2}(\theta_{i,j})$ represents a third weight based on the gain of the sensor 110 at the particular angle $\theta_{i,j}$ of the cell position with respect to the sensor 110, and $w^{f,2}(r_{i,j})$ represents a fourth weight based on the gain of the radar sensor 110 at the particular range $r_{i,j}$ of the cell position with respect to the radar sensor 110. The weights $w^{f,2}(\theta_{i,j})$ and $w^{f,2}(r_{i,j})$ can be looked up from a table based on the known behavior of the gain of the radar sensor 110. Because there is a higher confidence in step 340 than at step 335, the constant $p^{f,2}$ is greater than the constant $p^{f,1}$ used in calculating the instantaneous mass $m_{(i,j;k)}$(F) with low confidence. In addition, the weights $w^{f,2}(\theta_{i,j})$ and $w^{f,2}(r_{i,j})$ are normalized to a larger number between zero and one than the weights $w^{f,1}(\theta_{i,j})$ and $w^{f,1}(r_{i,j})$.

Returning to step 420, if the Pocc(i,j) satisfies the occupancy criterion ∈ occ, it is likely the cell is occupied. FIGS. 3C and 3D illustrate scenarios 3000 and 300D in which the cells 360C and 360D, respectively, are included in the regions 340A and 340B of cells around the radar reflections 330A and 330B with Pocc(i,j) that satisfy ∈ occ. Thus, cells 360C and 360D in scenarios 3000 and 300D, respectively, are likely occupied. The instantaneous mass calculator 240 proceeds to step 445 and determines whether the compensated radial velocity of the cell satisfies a velocity criterion ∈ v. For example, the instantaneous mass calculator 240 determines whether the compensated radial velocity v(i,j;k) is greater than ∈ v.

If the compensated radial velocity does not satisfy ∈ v at step 450, for example, the compensated radial velocity is less than or equal to ∈ v as illustrated in scenario 3000 shown in FIG. 3C, the instantaneous mass calculator 240 calculates the instantaneous mass $m_{(i,j;k)}$(SD) for a static-dynamic cell at a cell position (i,j) and a time k at step 455. The cell 360C is included in the region 340B associated with the lower radial velocity 350B, and thus, the compensated radial velocity associated with the cell 360C does not satisfy ∈v and the instantaneous mass calculator 240 cannot be certain whether the object occupying cell 360C is static or dynamic. For example, the instantaneous mass $m_{(i,j;k)}$(SD) can be represented as:

$$m_{(i,j;k)}(SD) = Pocc(i, j; k) * \rho occ(\text{radar})$$

where ρocc(radar) represents a fifth weight based on the overall SNR of the radar sensor 110. The instantaneous mass $m_{(i,j;k)}$(D) for a dynamic cell and the instantaneous mass $m_{(i,j;k)}$(F) for a free cell at the cell position (i,j) and the time k are set to zero.

Returning to step 450, if the compensated radial velocity satisfies the velocity criterion ∈v, for example, the compensated radial velocity is greater than ∈v as illustrated in scenario 300D in FIG. 3D, the instantaneous mass calculator 240 calculates the instantaneous mass $m_{(i,j;k)}$(D) for a dynamic cell (D) at a cell position (i,j) and a time k at step 460. The cell 360D is included in the region 340A associated with the higher radial velocity 350A, and thus, the compensated radial velocity associated with the cell 360D satisfies ∈v and the instantaneous mass calculator 240 has a high confidence that the object occupying cell 360D is moving. For example, the instantaneous mass $m_{(i,j;k)}$(D) can be represented as:

$$m_{(i,j;k)}(D) = Pocc(i, j; k) * \rho occ(\text{radar})$$

The instantaneous mass $m_{(i,j;k)}$(SD) for a static-dynamic cell and the instantaneous mass $m_{(i,j;k)}$(F) for a free cell at the cell position (i,j) and the time k are set to zero.

From each of steps 435, 440, 455, and 460, the instantaneous mass calculator 240 proceeds to step 470 and determines whether there are cells remaining in the FOV 320. If there are cells remaining at step 475, the instantaneous mass calculator 240 returns to step 420 and iterates through the remaining steps of process 400 until an instantaneous mass has been calculated for each cell in the FOV 320. Once there are no cells remaining at step 465, the process 400 ends and the instantaneous mass calculator 240 outputs the instantaneous masses 145 to the grid mapping processor 150.

Figure 6:
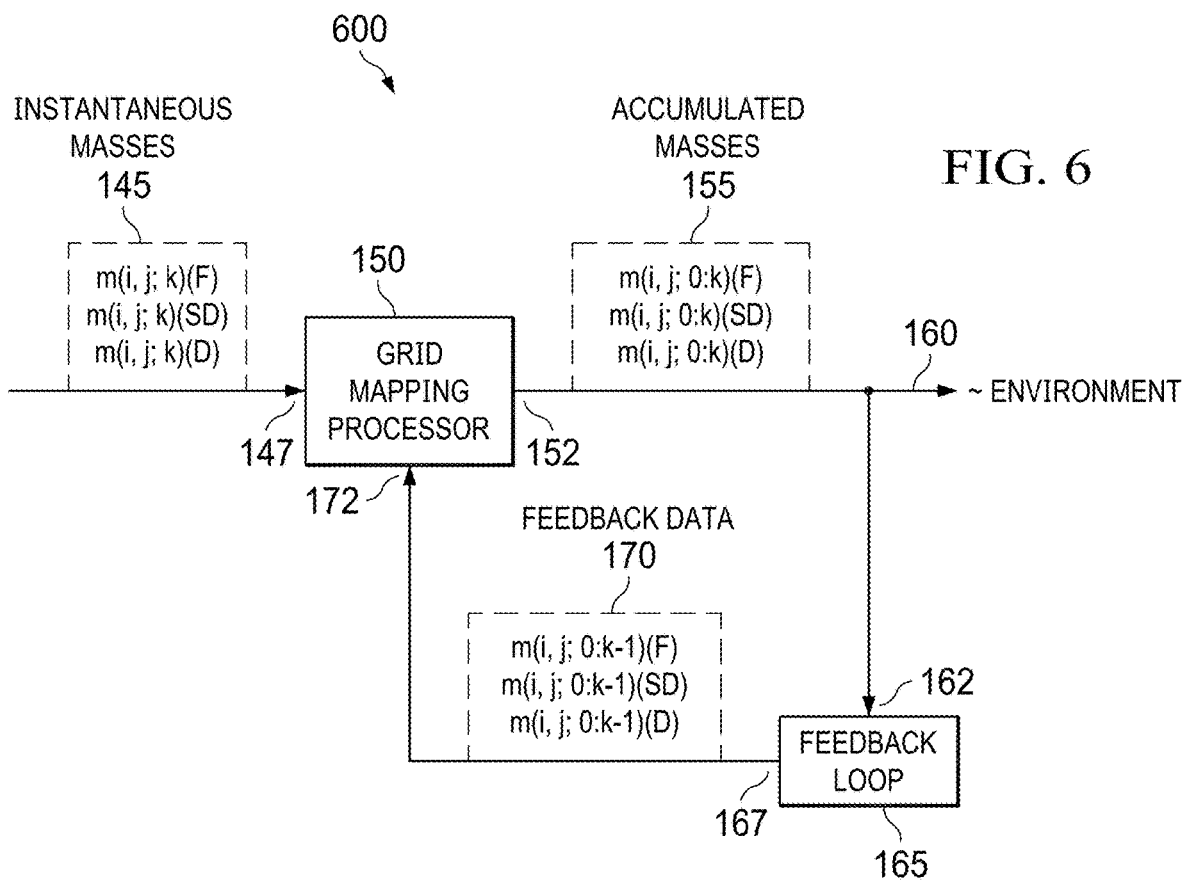
FIG. 6 shows an example data flow for the grid mapping processor shown in FIG. 1.

FIG. 6 illustrates an example data flow 600 for the grid mapping processor 150 shown in FIG. 1. The grid mapping processor 150 receives the instantaneous masses 145 at input 147. The instantaneous masses 145 include the instantaneous mass for the free state $m_{(i,j;k)}$(F), the instantaneous mass for the static-dynamic state $m_{(i,j;k)}$(SD), and the instantaneous mass for the dynamic state $m_{(i,j;k)}$(D). The grid mapping processor 150 also receives the feedback data 170 at input 172. The feedback data 170 includes the accumulated masses of the cells, that is, the combined instantaneous masses, from previous time instances 0:k−1. That is, the feedback data 170 includes the prior accumulated mass for the free state $m_{(i,j;0:k-1)}$(F), the prior accumulated mass for the static-dynamic state $m_{(i,j;0:k-1)}$(SD), and the prior accumulated mass for the dynamic state $m_{(i,j;0:k-1)}$(D).

The grid mapping processor 150 generates the accumulated masses 155 for the cells at the present time k. That is, the grid mapping processor calculates the updated accumulated mass for the free state $m_{(i,j;0:k)}$(F), the updated accumulated mass for the static-dynamic state $m_{(i,j;0:k)}$(SD), and the updated accumulated mass for the dynamic state $m_{(i,j;0:k)}$(D). The updated accumulated masses are calculated based on the instantaneous mass and the prior accumulated mass of an uncertain state (SDF) which represents the ambiguity of sensor data between the free state, dynamic state, and static-dynamic state.

The instantaneous mass of the uncertain state SDF $m_{(i,j;k)}$(SDF) can be represented as:

$$m_{(i,j;k)}(SDF) = 1 - m_{(i,j;k)}(F) - m_{(i,j;k)}(D) - m_{(i,j;k)}(SD)$$

The prior accumulated mass of the uncertain state SDF $m_{(i,j;0:k-1)}$(SDF) can be represented as:

$$m_{(i,j;0:k-1)}(SDF) = 1 - m_{(i,j;0:k-1)}(F) - m_{(i,j;0:k-1)}(D) - m_{(i,j;0:k-1)}(SD)$$

The updated accumulated mass for the free state $m_{(i,j;0:k)}$(F) can be represented as:

$$m_{(i,j;0:k)}(F) = [m_{(i,j;k)}(F)][m_{(i,j;0:k-1)}(F)] +$$
$$[m_{(i,j;k)}(F)][m_{(i,j;0:k-1)}(SDF)] + [m_{(i,j;k)}(SDF)][m_{(i,j;0:k-1)}(F)]$$

The updated accumulated mass for the static-dynamic state $m_{(i,j;0:k)}$(SD) can be represented as:

$$m_{(i,j;0:k)}(SD) = [m_{(i,j;k)}(SD)][m_{(i,j;0:k-1)}(SD)] +$$
$$[m_{(i,j;k)}(SD)][m_{(i,j;0:k-1)}(SDF)] + [m_{(i,j;k)}(SDF)][m_{(i,j;0:k-1)}(SD)]$$

The updated accumulated mass for the dynamic state $m_{(i,j;0:k)}$(D) can be represented as:

$$m_{(i,j;0:k)}(D) = [m_{(i,j;k)}(D)][m_{(i,j;0:k-1)}(D)] +$$
$$[m_{(i,j;k)}(SD)][m_{(i,j;0:k-1)}(D)] + [m_{(i,j;k)}(D)][m_{(i,j;0:k-1)}(SD)] +$$
$$[m_{(i,j;k)}(SDF)][m_{(i,j;0:k-1)}(D)] + [m_{(i,j;k)}(D)][m_{(i,j;0:k-1)}(SDF)]$$

The instantaneous and prior accumulated masses of the static-dynamic state (SD) contribute to the updated accumulated mass of the dynamic state (D) because the static-dynamic state (SD) is an ambiguity whether a cell is stationary or dynamic. Accounting for this ambiguity enables the grid mapping processor 150 to change state from static-dynamic to dynamic more quickly, which makes the resulting representation of the environment 160 more accurate in the presence of moving objects.

While the system 100 described herein with reference to FIG. 1, the inverse radar sensor model processor 140 described herein with reference to FIG. 2, the scenarios 300A-D described herein with reference to FIGS. 3A-D, the process 400 described herein with reference to FIG. 4, and the data flow 600 described herein with reference to FIG. 6 use only a single radar sensor 110 and inverse radar sensor model processor 140, the grid mapping processor can accumulate instantaneous masses from any number of radar sensors with corresponding inverse radar sensor model processors. In addition, the grid mapping processor can accumulate instantaneous masses from radar sensors, cameras, light detection and ranging (lidar) sensors, or any combination thereof.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. A device comprising:
a radar sensor configured to receive reflections indicating detections and generate data points representing the detections, in which each data point includes position and velocity information of a corresponding detection relative to the radar sensor; and
a processor coupled to the radar sensor configured to:
receive, from the radar sensor, a set of the data points for time k;
receive motion data for time k indicative of motion of the device at time k;
generate object data for time k based on the set of the data points for time k and the motion data for time k, the object data representative of locations of the detections in a space, a radial velocity at each of the locations, and a signal-to-noise ratio (SNR) at each of the locations; and
calculate, based on the object data for time k and a characteristic of the radar sensor, for each cell in a grid representing a field of view (FOV) of the radar sensor at time k, probabilities of the cell being in a free state indicating no detected object in the cell, a stationary state indicating a stationary detected object in the cell, and a dynamic state indicating that a dynamic object is detected in the cell.

2. The device of claim 1, further comprising:
a motion sensor configured to output raw motion data for time k;
a motion calculator configured to:
calculate a set of motion indicators including a velocity indicator for the device for time k based on the raw motion data for time k; and
a motion compensator configured to:
determine a compensation for a radial velocity of the velocity indicator of the set of motion indicators for time k to generate a compensated set of motion indicators that represents the motion data for time k received by the processor.

3. The device of claim 2, wherein the processor includes an inverse radar sensor model processor that includes:
an object data calculator configured to generate the object data for time k; and
a state calculator configured to calculate the state probabilities at time k for each cell, and output the state probabilities calculated at time k of each cell.

4. The device of claim 3, wherein the state calculator is configured to, for each cell in the grid, each cell being designated by (i,j):

determine a probability of object occupancy of cell (i,j) at time k (Pocc(i,j;k)) based on a range of the cell (i,j) from the locations of the reflections;
determine a position of the cell (i,j) with respect to a position of the radar sensor;
update the Pocc(i,j;k) based on an ambiguity of the data points associated with the position of the cell (i,j); and
determine whether the Pocc(i,j;k) satisfies an occupancy criterion ∈occ.

5. The device of claim 4, wherein:
in response to the Pocc(i,j;k) not satisfying the ∈occ, perform a first set of operations; and
in response to the Pocc(i,j;k) satisfying the ∈occ, perform a second set of operations.

6. The device of claim 5, wherein, to perform the first set of operations, the state calculator is configured to:
determine whether the position of the cell (i,j) is between the position of the radar sensor and a position of a cell (a,b) with a corresponding Pocc(a,b;k) that satisfies the ∈occ;
in response to the position of the cell (i,j) not being between the radar sensor and the position of the cell (a,b) calculate, with low confidence, that the state of the cell (i,j) at time k is free; and
in response to the position of the cell (i,j) being between the radar sensor and the position of the cell (a,b) calculate, with high confidence, that the state of the cell (i,j) at time k is free.

7. The device of claim 5, wherein, to perform the second set of operations, the state calculator is configured to:
determine whether an adjusted radial velocity associated with the cell (i,j) satisfies a velocity criterion ∈v;
in response to the adjusted radial velocity not satisfying the ∈v, calculate a probability of cell (i,j) having the static state; and
in response to the radial velocity satisfying the ∈v, calculate a probability of cell (i,j) having the dynamic state.

8. The device of claim 1, wherein the radar sensor characteristic includes at least one of:
an antenna gain, and SNR of the radar sensor.

9. The device of claim 1, further comprising:
a grid mapping processor configured to:
receive the calculated probabilities of each cell at the time k and state probabilities for each cell calculated during a time period 0:k−1 prior to time k; and
determine, for each cell, updated state probabilities for a time period 0:k based on the calculated probabilities of each cell at the time k and the state probabilities for each cell calculated during a time period 0:k−1 prior to time k.

10. A system comprising:
processing circuitry;
a non-transitory computer readable medium (CRM) storing executable code that, when executed by the processing circuitry, is configured to cause the system to:
receive reflections indicating detections and generate data points representing the detections, in which each data point includes position and velocity information of a corresponding detection relative to a radar sensor of the system;
receive, from the radar sensor, a set of the data points for time k;
receive motion data for time k indicative of motion of the radar sensor at time k;
generate object data for time k based on the set of the data points for time k and the motion data for time k, the object data representative of locations of the detections in a space, a radial velocity at each of the locations, and a signal-to-noise ratio (SNR) at each of the locations; and calculate, based on the object data for time k and a characteristic of the radar sensor, for each cell in a grid representing a field of view (FOV) of the radar sensor at time k, probabilities of the cell being in a free state indicating no detected object in the cell, a stationary state indicating a stationary detected object in the cell, and a dynamic state indicating a dynamic object detected in the cell.

11. The system of claim 10, wherein the executable code, when executed by the processing circuitry, is further configured to cause the system to:

calculate a set of motion indicators including a velocity indicator for the system for time k based on a raw motion data for time k; and determine a compensation for a component of the velocity indicator of the set of motion indicators for time k to generate a compensated set of motion indicators that represents the received motion data for time k.

12. The system of claim 10, wherein each cell in the grid is designated by (i,j), and wherein the executable code, when executed by the processing circuitry, is further configured to cause the system to, for each cell in the grid:

determine a probability of object occupancy of cell (i,j) at time k (Pocc(i,j;k)) based on a range of the cell (i,j) from the locations of the reflections;

determine a position of the cell (i,j) with respect to a position of the radar sensor;

update the Pocc(i,j;k) based on an ambiguity of the data points associated with the position of the cell (i,j); and determine whether the Pocc(i,j;k) satisfies an occupancy criterion $\in$occ.

13. The system of claim 12, wherein the executable code, when executed by the processing circuitry, is further configured to cause the system to:

in response to the Pocc(i,j;k) not satisfying the $\in$occ, perform a first set of operations; and in response to the Pocc(i,j;k) satisfying the $\in$occ, perform a second set of operations.

14. The system of claim 13, wherein the executable code, when executed by the processing circuitry, is further configured to cause the system to:

determine whether the position of the cell (i,j) is between the position of the radar sensor and a position of a cell (a,b) with a corresponding Pocc(a,b;k) that satisfies the $\in$occ;

in response to the position of the cell (i,j) not being between the radar sensor and the position of the cell (a,b) calculate, with low confidence, that the state of the cell (i,j) at time k is free; and in response to the position of the cell (i,j) being between the radar sensor and the position of the cell (a,b) calculate, with high confidence, that the state of the cell (i,j) at time k is free.

15. The system of claim 13, wherein the executable code, when executed by the processing circuitry, is further configured to cause the system to:

determine whether an adjusted radial velocity associated with the cell (i,j) satisfies a velocity criterion $\in$v;

in response to the adjusted radial velocity not satisfying the $\in$v, calculate a probability of cell (i,j) having the static state; and in response to the radial velocity satisfying the $\in$v, calculate a probability of cell (i,j) having the dynamic state.

16. A device comprising:

motion sensing and processing circuitry configured to generate compensated motion data for a first time based on raw motion data and a set of motion indicators including a velocity indicator for the device calculated based on the raw motion data; and a radar sensor configured to receive reflections indicating detections and generate data points for the first time representing the detections, in which each data point includes position and velocity information of a corresponding detection relative to the radar sensor;

a first circuit configured to generate object data for the first time based on the set of the data points for the first time and the compensated motion data for the first time; and a second circuit configured to calculate, based on the object data for the first time and a characteristic of the radar sensor, for each cell in a grid representing a field of view (FOV) of the radar sensor at the first time, probabilities of the cell being in a free state indicating no detected object in the cell, a stationary state indicating a stationary detected object in the cell, and a dynamic state indicating that a dynamic object is detected in the cell.

17. The device of claim 16, wherein the object data is representative of locations of the detections in a space, a radial velocity at each of the locations, and a signal-to-noise ratio (SNR) at each of the locations.

18. The device of claim 16, wherein the first circuit includes:

an object level data calculator configured to generate the object data for the first time; and a state calculator configured to calculate the probabilities of the cell being in the free state, the stationary state, and the dynamic state.

19. The device of claim 16, further comprising a third circuit configured to:

receive the calculated probabilities and probabilities for each cell calculated during a time period prior to first time; and determine, for each cell, updated state probabilities for a first time period including the first time based on the calculated probabilities of each cell at the first time and the state probabilities for each cell calculated during a second time period prior to the first time.

20. The device of claim 19, wherein the third circuit includes a feedback loop.

\* \* \* \* \*